US010642977B1

(12) United States Patent
Ren et al.

(10) Patent No.: US 10,642,977 B1
(45) Date of Patent: May 5, 2020

(54) BENIGN FILE LIST GENERATION

(71) Applicant: DiDi Research America, LLC, Mountain View, CA (US)

(72) Inventors: Liwei Ren, San Jose, CA (US); Qiaoyue Wang, San Jose, CA (US)

(73) Assignee: DiDi Research America, LLC, Mountain View, CA (US)

( * ) Notice: Subject to any disclaimer, the term of this patent is extended or adjusted under 35 U.S.C. 154(b) by 0 days.

(21) Appl. No.: 16/221,799

(22) Filed: Dec. 17, 2018

(51) Int. Cl.
G06F 21/00 (2013.01)
G06F 21/56 (2013.01)
G06F 21/57 (2013.01)
G06F 21/50 (2013.01)
G06F 21/55 (2013.01)

(52) U.S. Cl.
CPC ............ *G06F 21/565* (2013.01); *G06F 21/50* (2013.01); *G06F 21/55* (2013.01); *G06F 21/57* (2013.01); *G06F 21/577* (2013.01); *G06F 2221/034* (2013.01)

(58) Field of Classification Search
CPC .......... G06F 21/50; G06F 21/55; G06F 21/56; G06F 21/561; G06F 21/562; G06F 21/563; G06F 21/564; G06F 21/565; G06F 21/57; G06F 21/577
See application file for complete search history.

(56) References Cited

U.S. PATENT DOCUMENTS

| 6,757,675 | B2 | 6/2004 | Aiken et al. |
| 7,516,130 | B2 | 4/2009 | Ren et al. |
| 8,131,751 | B1 | 3/2012 | Behzadi et al. |
| 8,161,552 | B1 | 4/2012 | Sun et al. |
| 8,359,472 | B1 | 1/2013 | Ren et al. |
| 8,549,022 | B1 | 10/2013 | Kaminski, Jr. |
| 2006/0230452 | A1 | 10/2006 | Field |
| 2008/0270991 | A1 | 10/2008 | Zeidman |
| 2012/0072725 | A1 | 3/2012 | Fanton et al. |
| 2013/0074186 | A1* | 3/2013 | Muttik ................ G06F 21/51 726/24 |
| 2017/0331841 | A1 | 11/2017 | Hu et al. |

OTHER PUBLICATIONS

PCT International Search Report and the Written Opinion dated Mar. 29, 2019, issued in related International Application No. PCT/US2018/068147 (10 pages).
PCT International Search Report and the Written Opinion dated Mar. 28, 2019, issued in related International Application No. PCT/US2018/067904 (9 pages).

(Continued)

*Primary Examiner* — Edward Zee
(74) *Attorney, Agent, or Firm* — Sheppard Mullin Richter & Hampton LLP (57) ABSTRACT

Exception lists may be generated by combining a standard list and a client list. Standard benign file information identifying a set of standard benign files may be obtained. A set of standard signatures for the set of standard benign files may be obtained. Client benign file information identifying a set of client benign files for a client may be obtained. A set of client signatures for the set of client benign files for the client may be obtained. A client exception list for the client may be generated based on the set of standard signatures and the set of client signatures.

14 Claims, 5 Drawing Sheets

(56) References Cited

OTHER PUBLICATIONS

Garfinkel., "Fingerprinting Your Files", In: MIT technology review technical report. Aug. 4, 2004, [retrieved on Mar. 9, 2019 at: https://www.technologyreview.com/s/402961/fingerprinting-your-files/], 9 pages.
Schleimer et al., "Winnowing: Local Algorithms for Document Fingerprinting", Proceedings of the 2003 ACM SIGMOD International Conference on Management of Data, Jun. 12, 2003, ACM, 10 pages.
Sedgewick et al., "Guide to Application Whitelisting", NIST Special Publication 800-167, Oct. 31, 2015, [retrieved on May 2, 2019 at: http://dx.doi.org/10.6028/NIST.SP.800-167], 24 pages.
U.S. Appl. No. 16/031,364, filed Jul. 10, 2018.

* cited by examiner

BENIGN FILE LIST GENERATION

TECHNICAL FIELD

The disclosure relates generally to generating a list of benign files.

BACKGROUND

Two goals of malware detection software are to have a high detection rate for actual malware, and to have a low rate of false positives. A false positive occurs when a benign file is treated as malware. Malware detection typically uses a single stage approach. With a single stage approach, the two goals are at odds with each other, as adapting the detection to increase one rate causes the other rate to also increase. By using a hybrid two stage approach, the false positive rate may be decreased while maintaining the actual detection rate.

SUMMARY

One aspect of the present disclosure is directed to a system for generating a list of benign files. The system may comprise one or more processors and one or more non-transitory computer-readable memories coupled to the one or more processors and configured with instructions executable by the one or more processors. Executing the instructions may cause the system to perform operations comprising: obtaining standard benign file information identifying a set of standard benign files; obtaining a set of standard signatures for the set of standard benign files; adding the standard benign file information to global benign file information identifying a set of global benign files, wherein the global benign file information is associated with a set of global signatures; obtaining first client benign file information identifying a first set of client benign files for a first client; determining, for a client benign file for the first client, whether the global benign file information identifies the client benign file; adding, in response to determining that the global benign file information does not identify the client benign file, a new signature corresponding to the client benign file to the set of global signatures; modifying the global benign file information to associate the client benign file with a first client identifier; obtaining a set of first client signatures for the first set of client benign files for the first client; and generating a first client exception list for the first client based on the set of standard signatures and the set of first client signatures.

In some embodiments, the set of first client signatures may be obtained based on the set of global signatures and the first client identifier.

Another aspect of the present disclosure is directed to a system for generating a list of benign files. The system may comprise one or more processors and one or more non-transitory computer-readable memories coupled to the one or more processors and configured with instructions executable by the one or more processors. Executing the instructions may cause the system to perform operations comprising: obtaining a set of standard signatures for the set of standard benign files; obtaining first client benign file information identifying a first set of client benign files for a first client; obtaining a set of first client signatures for the first set of client benign files for the first client; and generating a first client exception list for the first client based on the set of standard signatures and the set of first client signatures.

Yet another aspect of the present disclosure is directed to a method for generating a list of benign files, comprising: obtaining standard benign file information identifying a set of standard benign files; obtaining a set of standard signatures for the set of standard benign files; obtaining first client benign file information identifying a first set of client benign files for a first client; obtaining a set of first client signatures for the first set of client benign files for the first client; and generating a first client exception list for the first client based on the set of standard signatures and the set of first client signatures.

In some embodiments, obtaining the standard benign file information may include obtaining the standard benign file information from an organization that creates security standards.

In some embodiments, at least one signature in the first client exception list may be determined based on core information extracted from a corresponding file, wherein the core information extracted from the corresponding file matches core information extracted from a similar file.

In some embodiments, second client benign file information identifying a second set of client benign files for a second client may be obtained; a set of second client signatures for the second set of client benign files for the second client may be obtained; and a second client exception list for the second client based on the set of standard signatures and the set of second client signatures may be generated.

In some embodiments, the standard benign file information may be added to global benign file information identifying a set of global benign files, wherein the global benign file information is associated with a set of global signatures In some embodiments, it may be determined whether the global benign file information identifies the client benign file for a client benign file for the first client. In response to determining that the global benign file information does not identify the client benign file, a new signature corresponding to the client benign file may be added to the set of global signatures. Regardless of the determination, the global benign file information may be modified to associate the client benign file with a first client identifier.

In some embodiments, the set of first client signatures is obtained based on the set of global signatures and the first client identifier.

In some embodiments, a malware list may be obtained based on a set of signatures for a set of malware files. A selection may be received for a signature contained in both the malware list and the first client exception list. The selection may be to remove the signature from either the malware list or the first client exception list. The signature may be removed based on the selection.

In some embodiments, the first client exception list may be provided to the first client.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The approaches disclosed herein improve functioning of computing systems that generate or use lists of benign files. Three common approaches for malware detection are signature based, behavior based, and machine learning based. The signature based approach has a low rate of determining false positive, however, the approach can have trouble detecting zero-day exploits. Behavior and machine learning based approaches are more adept at detecting new threats. However, these approaches may lead to false positives, such as killing benign files. Malware detection may be improved by using a hybrid two stage approach. The second stage of this approach uses an exception list of benign files. However, requiring clients to create an exception list on their own can be very time consuming and troublesome for the client. An alternative, using a one-size-fits all exception list, has the shortcomings of creating an overwhelmingly large exception list, with many files not applicable to a particular client, through which it is hard to track specific incidents, and which is not resistant to changes in file version. Malware detection may further be improved by using exception lists which are generated by combining a standard list and a client list.

Figure 1:
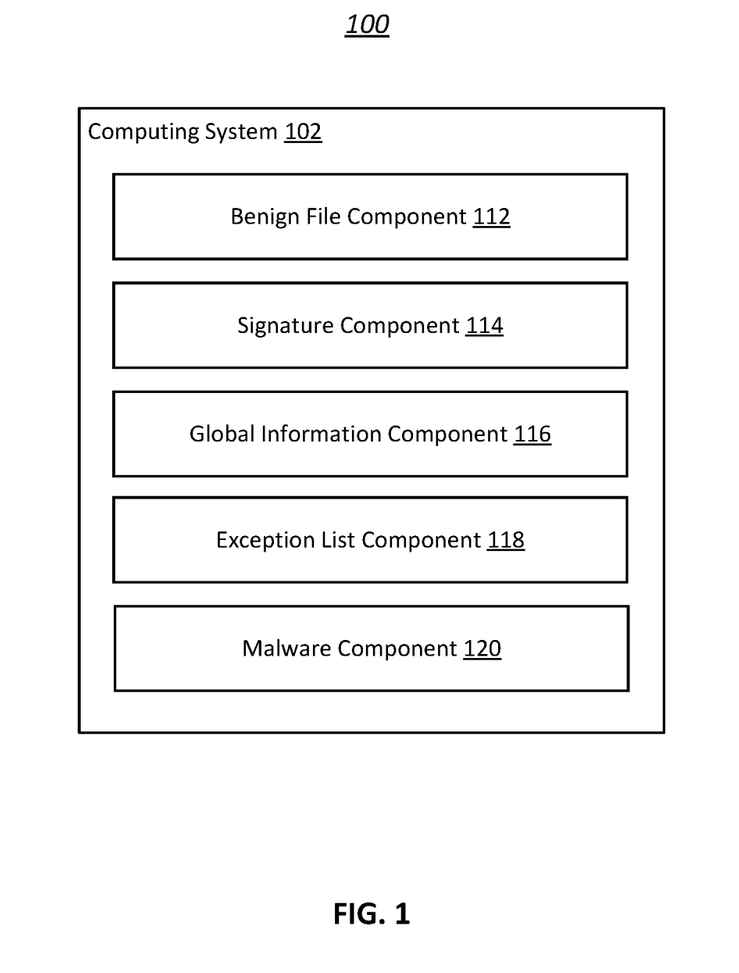
FIG. 1 illustrates an example environment for generating a list of benign files, in accordance with various embodiments of the disclosure.

FIG. 1 illustrates an example environment 100 for generating lists of benign files, in accordance with various embodiments. The example environment 100 may include a computing system 102. The computing system 102 may include one or more processors and memory (e.g., permanent memory, temporary memory). The processor(s) may be configured to perform various operations by interpreting machine-readable instructions stored in the memory. The computing system 102 may include other computing resources. The computing system 102 may have access (e.g., via one or more connections, via one or more networks) to other computing resources.

The computing system 102 may include a benign file component 112, a signature component 114, a global information component 116, and an exception list component 118. In some embodiments the computing system 102, may further include a malware component 120. The computing system 102 may include other components. While the computing system 102 is shown in FIG. 1 as a single entity, this is merely for ease of reference and is not meant to be limiting. One or more components or one or more functionalities of the computing system 102 described herein may be implemented in a single computing device or multiple computing devices. In some embodiments, one or more components or one or more functionalities of the computing system 102 described herein may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The benign file component 112 may be configured to obtain file information identifying a set of benign files. File information may include standard benign file information and client benign file information. File information may include a list of file identifiers (file IDs) that identify a particular file. For example, a file ID may include a file name, an entire file, and file metadata. Sets of benign files may include standard benign files and client benign files. A benign file in a set of benign files may refer to a file that has been identified as beneficial, not malware, or otherwise should be allowed to execute. A file may refer to a collection of data or information stored in one unit. A file may include a data file or a program file. Data or information may be stored as text, code, or binary in the file. For example, a file may include a text document, an image, a pdf, an executable, a bash file, or a script.

Obtaining file information may include one or more of accessing, acquiring, analyzing, determining, examining, identifying, loading, locating, opening, receiving, retrieving, reviewing, storing, or otherwise obtaining the file information. The benign file component 112 may obtain benign file information from one or more locations. For example, the benign file component 112 may obtain benign file information from a storage location, such as an electronic storage of the computing system 102, an electronic storage of a device accessible via a network (e.g., server), one of more client devices (e.g., desktop, laptop, smartphone, tablet, mobile device), or other locations.

In some embodiments, the location from which benign file information is obtained may correspond to a type of benign file information that is obtained. For example, the benign file component 112 may obtain standard benign file information identifying sets of standard benign files from an organization that creates security standards. For example, the business organization may be a business, non-profit organization, professional association, or government office, such as the National Institute of Standards and Technology (NIST). In another example, the benign file component 112 may obtain client benign file information identifying sets of client benign files for particular clients. This may include obtaining separate benign file information from two or more different clients. For example, first client benign file information identifying a first set of client benign files for a first client may be obtained from the first client and second client benign file information identifying a second set of client benign files for a second client may be obtained from the second client.

The signature component 114 may be configured to obtain sets of signatures for the sets of benign files. Sets of signatures may include sets of standard signatures and sets of client signatures. The signature component 114 may obtain sets of signatures from one or more locations. For example, data can be extracted for files to create sets of signatures at another computing device/system (e.g., desktop, laptop, smartphone, tablet, mobile device, server), and the signature component 114 may obtain the sets of signatures over a communication network. In another example, one or more processors of the computing system 102 may extract data from files in order to create sets of signatures.

In some embodiments, the computing system 102 obtains entire files through benign file component 112. For example, a client can send a list of file information containing entire files. In this embodiment, the signature component 114 may obtain signatures from the received files. For example, the signature component 114 may generate signatures by analyzing the content of the received files. In other embodiments, benign file component 112 does not obtain entire files. For example, an organization may initially send a list of names of benign files to the computing system 102. In this embodiment, the computing system 102 must obtain the actual files before the signature component 114 can obtain (e.g., generate) signatures for the files. In this embodiment, the signature component 114 can fetch the actual files. For example, the signature component 114 may request the actual files from the sender of the file information. In another example, the signature component 114 may request the actual files from an outside source, such as a software vendor. In other embodiments, the signature component 114 may obtain already generated signatures from an outside component.

In some embodiments, signatures may be determined based on core information extracted from a corresponding file. The core information may include a string, metadata, or a hash value. For example, a string or metadata can be extracted from a file to obtain a signature. In another example, a sequence of characters, such as an entire file or a portion of the file, may be hashed to obtain a signature for a file. Hash functions may include MID5 and SHA-1. In yet another example, two or more plain text strings, hash values, or a combination thereof may be combined to form the signature.

In some embodiments, core information extracted from the corresponding file may match core information extracted from a similar file. Core information may refer to information within the file that remains the same through different versions of the file or within the same family of files. This may allow signatures to resist changes to files. For example, the same core information may be extracted from a file and a subsequent version of the file. In another example, the same core information may be extracted from all the files in a family of software products. In some embodiments, the signatures may be generated from files based on approaches described in U.S. patent application Ser. No. 16/031,364 filed on Jul. 10, 2018, entitled "Improved File Fingerprint Generation," which is hereby incorporated herein by reference in its entirety.

The global information component 116 may be configured to store global benign file information identifying a set of global benign files in association with a set of global signatures. When standard benign file information is obtained, the global information component 116 may add some or all of the standard benign file information to the global benign file information. The global information component 116 may store source information for each file. The source information may include both outside organizations that send standard benign file information, as well as clients that have identified a particular benign file. For example the global information component 116 may store an entry for each file that has been identified. Each entry may store a file ID, a signature for the file, a list of all the organizations that have sent information identifying the file as a standard benign file, and a list of all the clients that have identified the file as a benign file.

In some embodiments, when benign file information identifying a set of client benign files is obtained for a client, the global information component 116 may determine whether the global benign file information identifies a client benign file. For example, the global information component 116 may loop through each file in the set of client benign files and check if the file is already included in the global benign file information. If the global benign file information does not identify the client benign file, it may mean that a signature has not yet been generated for the file. If this is the case, a new signature corresponding to the client benign file to the set of global signatures may be added to a global information database (e.g. global benign file database 230 described with respect to FIG. 2 below). For example, a new entry may be created in the global information database corresponding to the file ID, the new signature may be added to the entry, and the entry may be associated with the source of the benign file information. If the global information database already contains an entry with the file ID, it may mean that a signature already exists for the file. In this case, the source of the benign file information may be associated with the existing entry. For example, if the source of the benign file information is a first client, a first client identifier may be associated with the entry in the global benign file information. A client may receive a client identifier when they register. In another example, if the source of the benign file information is an outside organization, the organization may be associated with the entry in the global benign file information.

In some embodiments, sets of client signatures may be obtained based on the set of global signatures and client identifiers. For example, a set of first client signatures may be generated by determining all of the signatures in the global information database that are associated with the first client as the source of the file information.

The exception list component 118 may be configured to generate a client exception list for the client based on the set of standard signatures and the set of client signatures. The client exception list may be created by combining the set of standard signatures and the set of client signatures. For example, in an embodiment in which signatures are stored in the global information database, a first client exception list may be generated by obtaining all of the signatures associated with the first client identifier, as well as all signatures associated with standard organizations.

In some embodiments, the first client exception list may be provided to the first client or provided for use with respect to the first client. For example, the first client exception list may be sent through a communication network to the client device of the first client. As another example, the first client exception list may be sent through a communication network to a device or a component that performs malware detection for the first client.

In some embodiments, the malware component 120 may be configured to obtain a malware list based on a set of signatures for a set of malware files. Malware may refer to file(s) that performs operations that a user does not desire. Malware may be a file which can maliciously replicate, add, delete, or modify itself or other files on a device. Malware may include viruses, worms, trojan horses, or other malicious programs. For example, malware may create a backdoor on a device which grants an unauthorized user access to the device. Malware may turn a device into a bot as part of a bot net, and drain the computing resources of the device.

Information within the malware list (e.g., identifying malware, including signatures for malware) and a client exception list (e.g., the first client exception list) may be compared to detect potential conflict between the lists. If a file is listed in both the malware list and a client exception list, the listing of the file in one of the lists may be in error. A selection may be received for a signature contained in both the malware list and the client exception list. For example, a user may be presented with a warning that there is a conflict between the malware list and the client exception list, and may be provided with an option to select the removal of the corresponding signature from either the malware list or the client exception list, or from both lists. The signature may be removed based on the selection. The malware list of signatures may be stored separately from lists of benign signatures.

Figure 2:
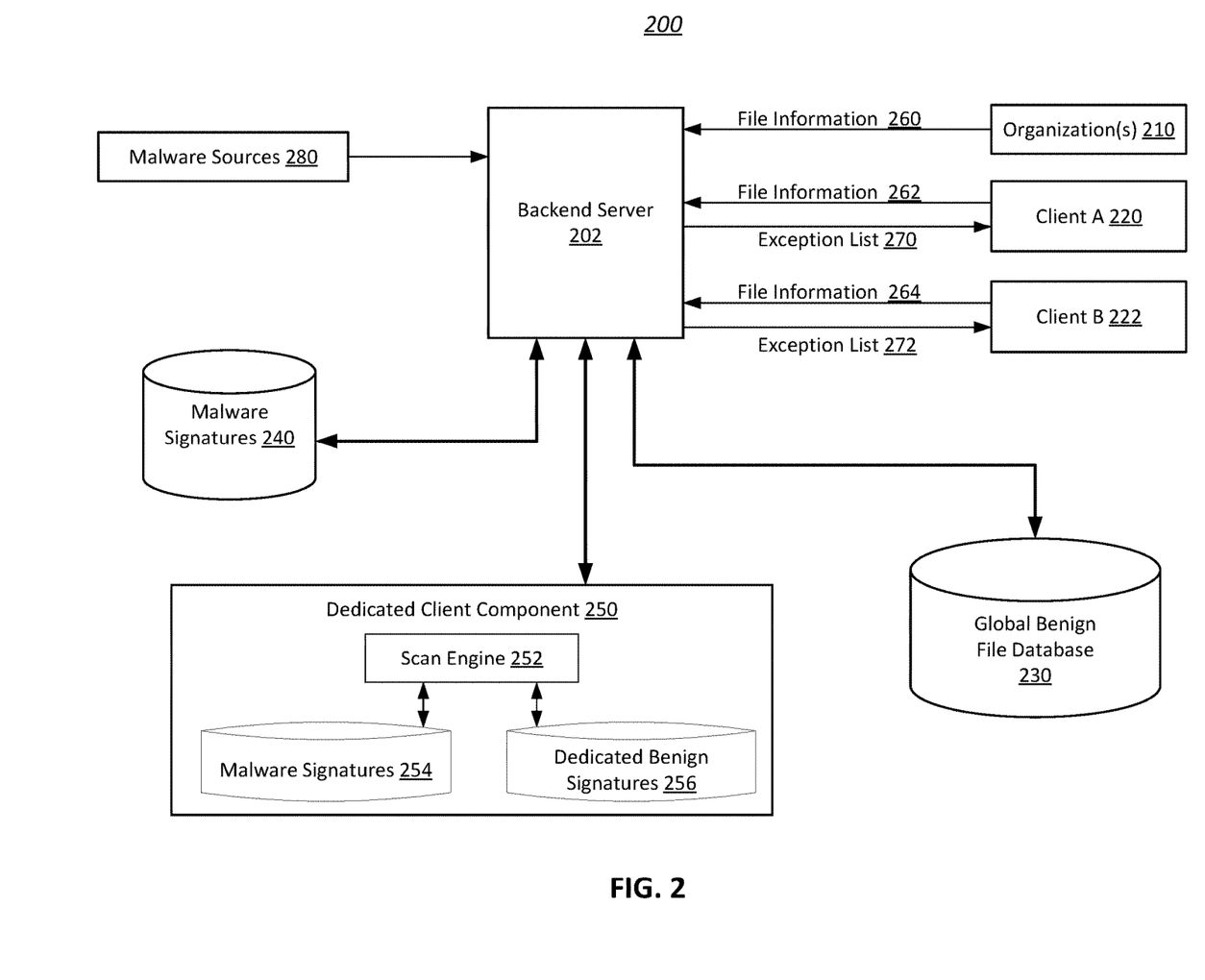
FIG. 2 illustrates an example system 200 for managing signatures and exception lists, in accordance with various embodiments of the disclosure.

FIG. 2 illustrates an example system 200 for managing signatures and client exception lists, according to various embodiments of the present disclosure. The operations of the system 200 presented below are intended to be illustrative. Depending on the implementation, the system 200 may include additional, fewer, or alternative operations. The system may be implemented in various computing systems or devices including one or more processors. For example, multiple of the presented components may be located on the same computing device. In another example, the presented components may represent separate computing devices connected over a network.

In various embodiments, the system 200 may include backend server 202. The backend server 202 may receive file information 260, 262, and 264 from organization(s) 210, client A 220, and client B 222 respectively. For example, file information 260 may include standard benign file information identifying a set of standard benign files, file information 262 may include first client benign file information identifying a first set of client benign files for a first client (e.g., client A 220), and file information 264 may include second client benign file information identifying a second set of client benign files for a second client (e.g., client B 222). Exception lists 270 and 272 may be sent by backend server 202 to client A 220 and client B 222 respectively. For example, exception list 270 may be generated by combining signatures for benign file identified by client A 220 with signatures for benign file identified by organization(s) 210. After exception list 270 has been generated, it may be transmitted to client A 220.

The backend server 202 may additionally be connected to global benign database 230, malware server 240, and dedicated client component 250. The global benign database 230, the malware server 240, and the dedicated client component 250 may be located on the same device as backend server 202, the same local network as backend server 202, the same cloud computing environment as backend server 202, separate computing devices, or on proxy servers. The proxy servers may be located proximate to one or more of the components of system 200. In addition, dedicated client component 250 may be located on the same device as client A 220 or client B 222, or on the same local network as either client A 220 or client B 222.

The global benign database 230 may store signatures of benign files in association with file information identifying the benign files, as well as information on sources that have identified the files as benign. The malware signatures 240 may be a separate database from the global benign database 230, and store signatures of files that have been identified as malware. The malware files may be identified by malware sources 280. Malware sources 280 may send file identifiers, as well as actual malware files to the backend server 202. In some embodiments, organization(s) 210, client A 220, or client B 222 may be malware sources 280.

The dedicated client component 250 may include scan engine 252. Scan engine 252 may be configured to determine actual malware files, as well as suspicious files that are false positive. A suspicious files may be a file that has been identified as potentially malware. Potential malware may be identified using a signature based approach, a behavior based approach, or a machine learning approach. The signature based approach may compare a signature for the file to the signatures in malware signatures 254. Behavior based malware detection may execute files in a virtual machine and observe the behaviors of the suspicious file. The behaviors of the suspicious file may be compared to behavior rules to determine whether the file is potentially malicious or benign. In some embodiments, machine learning may be used to identify potentially malicious files. A machine learning component may be trained using a sample set of malware. A file may be scanned based on the trained component to determine if it is potentially malicious.

A false positive is a benign file that has erroneously been identified as potentially malicious. In order to reduce the rate of false positives, the dedicated client component 250 may further extract a signature from the potentially malicious file. This signature may be compared to a list of benign file signatures in dedicated benign signatures 256. The list of benign file signatures can be a list of signatures dedicated to a particular client. For example, the list of benign file signatures may be the exception list 270 or 272. If the signature from the potentially malicious file matches a signature in dedicated benign signatures 256, the file may be identified as a false positive and a benign file. In some embodiments, the behavior based rules or the machine learning component may be updated. If the potentially malicious file does not match a signature in dedicated benign signatures 256, the file can be identified as malware. Once identified as malware, a file can be prevented from executing, be deleted, or be quarantined. In addition, a signature can be generated for the malware file and added to malware signatures 254.

In some embodiments, a user may be able to identify a file as benign after it has been identified as a malware. In this embodiment, the file may be allowed to execute. In addition, a signature for the file can be added to a benign file list associated with the user, and removed from any malware signature lists.

Figure 3:
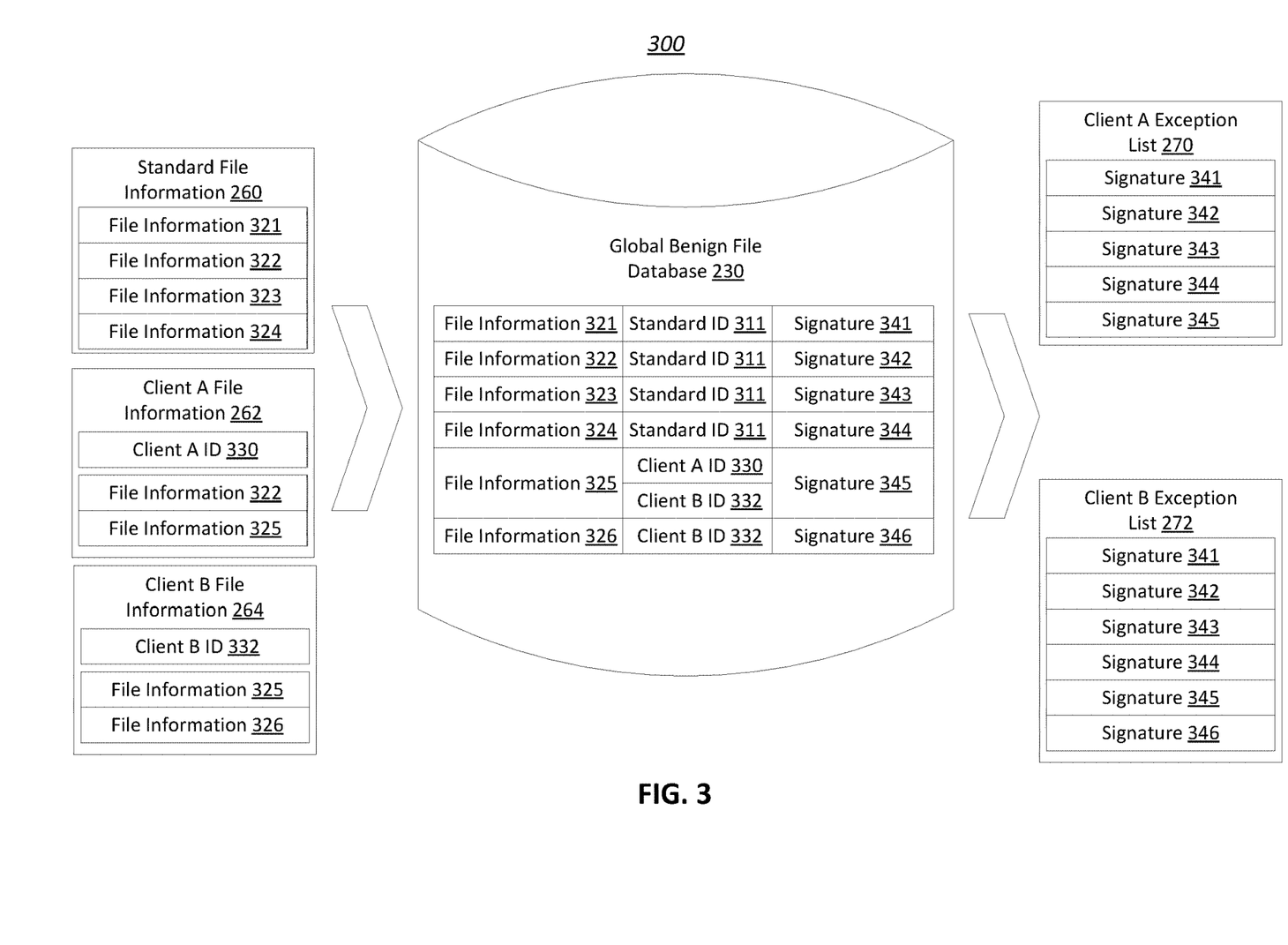
FIG. 3 illustrates an example process 300 for managing global benign file database 230, in accordance with various embodiments of the disclosure.

FIG. 3 illustrates an example process 300 for managing global benign file database 230, in accordance with various embodiments of the disclosure. Global benign file database 230 may receive standard file information 260, client A file information 262, and client B file information 264. The standard file information 260 may include file information 321, 322, 323, and 324, each of which may correspond to an individual file. The client A file information 262 may include a client A ID 330, which associates file information with client A. The client A file information 262 may additionally include file information 322 and 325. For example, client A may not know that the file identified by file information 322 is included in the set of standard files, and so may include the file information 322 in client A file information 262. The client B file information 264 may include a client B ID 332, which associates file information with client B. The client B file information 264 may additionally include file information 325 and 326.

Global benign file database 230 may store an entry for all of the received file information in which file information is associated with corresponding signatures. For example file information 321, 322, 323, 324, 325, and 326 may be associated with signatures 341, 342, 343, 344, 345, and 346. In addition, each entry may be associated with the source of the file information. File information 321, 322, 323, and 324 may be associated with standard ID 311 because that file information was part of the standard file information 260. File information 325 may be associated with both client A ID 330 and client B ID 332 because file information 325 is included in both client A file information 262 and client B file information 264.

Exception list 270 for client A and exception list 272 for client B may be generated using the information contained in the global benign file database 230. Client A exception list 270 may be generated by combining all of the signature associated with standard ID 311 and all of the signatures associated with client A ID 330. Client B exception list 272 may be generated by combining all of the signature associated with standard ID 311 and all of the signatures associated with client B ID 332.

Figure 4:
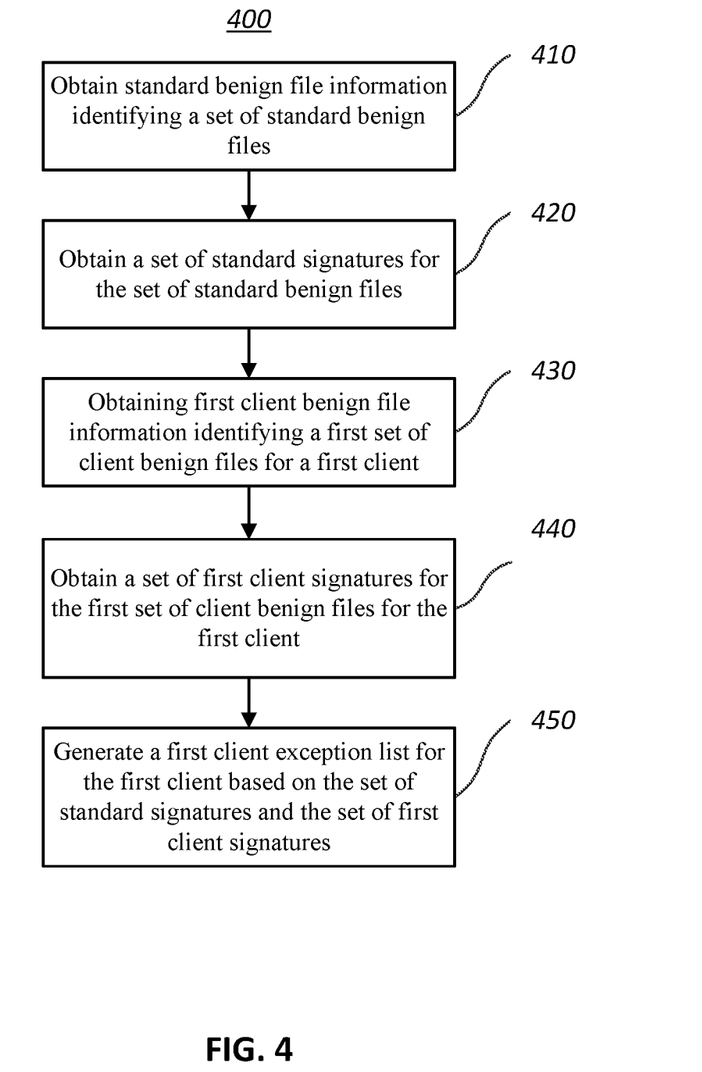
FIG. 4 illustrates a flowchart of an example method 400, according to various embodiments of the present disclosure.

FIG. 4 illustrates a flowchart of an example method 400, according to various embodiments of the present disclosure. The method 400 may be implemented in various environments including, for example, the environment 100 of FIG. 1 or the system 200 of FIG. 2. The operations of the method 400 presented below are intended to be illustrative. Depending on the implementation, the method 400 may include additional, fewer, or alternative steps performed in various orders or in parallel. The method 400 may be implemented in various computing systems or devices including one or more processors.

With respect to the method 400, at block 410, standard benign file information identifying a set of standard benign files may be obtained. At block 420, a set of standard signatures for the set of standard benign files may be obtained. At block 430, first client benign file information identifying a first set of client benign files for a first client may be obtained. At block 440, a set of first client signatures for the first set of client benign files for the first client may be obtained. At block 450, a first client exception list for the first client based on the set of standard signatures and the set of first client signatures may be generated.

Figure 5:
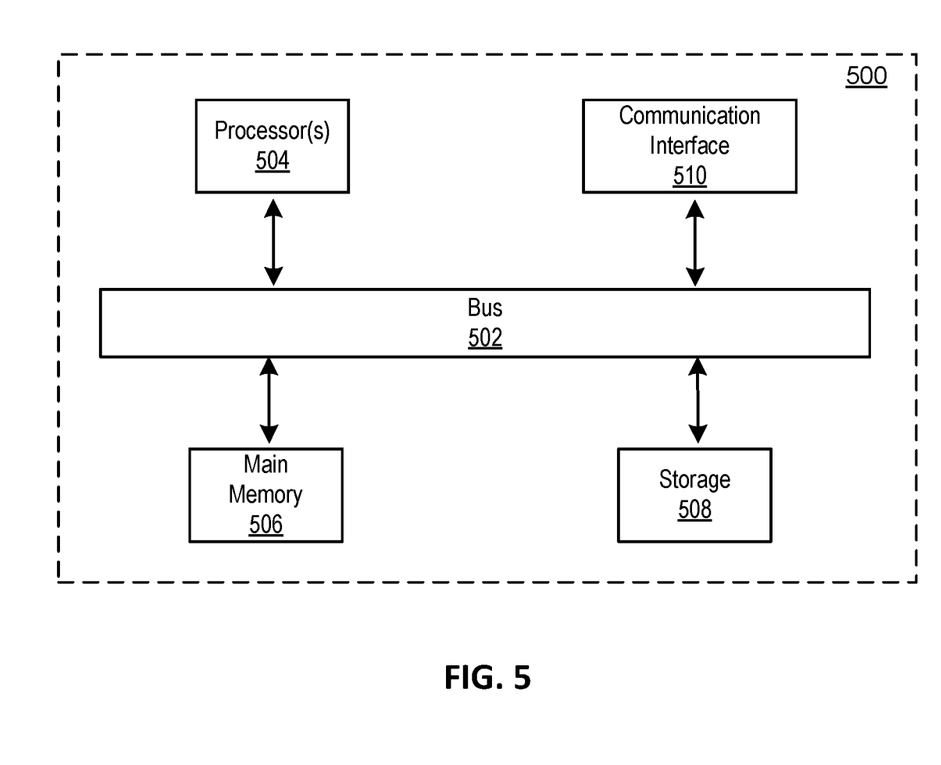
FIG. 5 is a block diagram that illustrates a computer system 500 upon which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. Main memory 506 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 508. Execution of the sequences of instructions contained in main memory 506 causes processor(s) 504 to perform the process steps described herein.

For example, the computing system 500 may be used to implement the computing system 102 or one or more components of the computing system 102 shown in FIG. 1. As another example, the process/method shown in FIG. 4 and described in connection with this figure may be implemented by computer program instructions stored in main memory 506. When these instructions are executed by processor(s) 504, they may perform the steps as shown in FIG. 4 and described above. In alternative embodiments, hard-wired circuitry may be used in place of or in combination with software instructions.

The computer system 500 also includes a communication interface 510 coupled to bus 502. Communication interface 510 provides a two-way data communication coupling to one or more network links that are connected to one or more networks. As another example, communication interface 510 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Certain embodiments are described herein as including logic or a number of components. Components may constitute either software components (e.g., code embodied on a machine-readable medium) or hardware components (e.g., a tangible unit capable of performing certain operations which may be configured or arranged in a certain physical manner). As used herein, for convenience, components of the computing system 102 may be described as performing or configured for performing an operation, when the components may comprise instructions which may program or configure the computing system 102 to perform the operation.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. A system for generating a list of benign files, comprising one or more processors and one or more non-transitory computer-readable memories coupled to the one or more processors and configured with instructions executable by the one or more processors to cause the system to perform operations comprising:
    obtaining standard benign file information identifying a set of standard benign files;
    obtaining a set of standard signatures for the set of standard benign files;
    adding the standard benign file information to global benign file information identifying a set of global benign files, wherein the global benign file information is associated with a set of global signatures;
    obtaining first client benign file information identifying a first set of client benign files for a first client;
    determining, for one client benign file of the first set of client benign files, whether the global benign file information identifies the one client benign file;
    adding, in response to determining that the global benign file information does not identify the one client benign file, a new signature corresponding to the one client benign file to the set of global signatures;
    modifying the global benign file information to associate the one client benign file with an identifier of the first client;
    obtaining a set of first client signatures for the first set of client benign files for the first client; and
    generating a first client exception list for the first client based on the set of standard signatures and the set of first client signatures.

2. The system of claim 1, wherein obtaining the standard benign file information includes obtaining the standard benign file information from an organization that creates security standards.

3. The system of claim 1, wherein at least one signature in the first client exception list is determined based on core information extracted from a corresponding file, wherein the core information extracted from the corresponding file matches core information extracted from a similar file.

4. The system of claim 1, the operations further comprising:
    obtaining second client benign file information identifying a second set of client benign files for a second client;
    obtaining a set of second client signatures for the second set of client benign files for the second client; and
    generating a second client exception list for the second client based on the set of standard signatures and the set of second client signatures.

5. The system of claim 1, wherein the set of first client signatures is obtained based on the set of global signatures and the identifier of the first client.

6. The system of claim 1, the operations further comprising:
    obtaining a malware list based on a set of signatures for a set of malware files;
    receiving, for a signature contained in both the malware list and the first client exception list, a selection to remove the signature from either the malware list or the first client exception list; and
    removing the signature based on the selection.

7. The system of claim 1, the operations further comprising:
    providing the first client exception list to the first client.

8. A method for generating a list of benign files, the method comprising:
    obtaining standard benign file information identifying a set of standard benign files;
    obtaining a set of standard signatures for the set of standard benign files;
    adding the standard benign file information to global benign file information identifying a set of global benign files, wherein the global benign file information is associated with a set of global signatures;
    obtaining first client benign file information identifying a first set of client benign files for a first client;
    determining, for one client benign file of the first set of client benign files, whether the global benign file information identifies the one client benign file;
    adding, in response to determining that the global benign file information does not identify the one client benign file, a new signature corresponding to the one client benign file to the set of global signatures;
    modifying the global benign file information to associate the one client benign file with an identifier of the first client;
    obtaining a set of first client signatures for the first set of client benign files for the first client; and
    generating a first client exception list for the first client based on the set of standard signatures and the set of first client signatures.

9. The method of claim 8, wherein obtaining the standard benign file information includes obtaining the standard benign file information from an organization that creates security standards.

10. The method of claim 8, wherein at least one signature in the first client exception list is determined based on core information extracted from a corresponding file, wherein the core information extracted from the corresponding file matches core information extracted from a similar file.

11. The method of claim 8, further comprising:
obtaining second client benign file information identifying a second set of client benign files for a second client;
obtaining a set of second client signatures for the second set of client benign files for the second client; and
generating a second client exception list for the second client based on the set of standard signatures and the set of second client signatures.

12. The method of claim 8, wherein the set of first client signatures is obtained based on the set of global signatures and the identifier of the first client.

13. The method of claim 8, further comprising:
obtaining a malware list based on a set of signatures for a set of malware files;
receiving, for a signature contained in both the malware list and the first client exception list, a selection to remove the signature from either the malware list or the first client exception list; and
removing the signature based on the selection.

14. The method of claim 8, further comprising:
providing the first client exception list to the first client.

* * * * *